United States Patent [19]
Chen et al.

[11] Patent Number: 6,132,813
[45] Date of Patent: Oct. 17, 2000

[54] HIGH DENSITY PLASMA SURFACE MODIFICATION FOR IMPROVING ANTIWETTING PROPERTIES

[75] Inventors: Pei C. Chen, Cupertino; Richard Hsiao, San Jose; Son Van Nguyen, Los Gatos; Andrew Chiuyan Ting, San Jose, all of Calif.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/989,051
[22] Filed: Dec. 11, 1997
[51] Int. Cl.[7] .......................................................... B05D 5/12
[52] U.S. Cl. .......................... 427/490; 427/127; 427/309; 427/491; 427/535; 427/536; 427/569
[58] Field of Search ...................................... 427/490, 491, 427/535, 536, 569, 127, 309

[56] References Cited

U.S. PATENT DOCUMENTS 5,661,618  9/1997  Brown et al. .
5,833,871  11/1998  Matsushita et al. ...................... 216/22

*Primary Examiner*—Bernard Pianalto
*Attorney, Agent, or Firm*—Monica D. Lee; Robert B. Martin

[57] ABSTRACT

A method for modifying a substrate surface, including the step of applying a high density plasma to the substrate surface in the presence of a hydrofluorocarbon gas and a carrier gas to form an antiwetting layer on the substrate surface. Optionally, the method including a cleaning step of contacting the slider surface with a carrier gas for a period of time effective to clean the surface.

13 Claims, 2 Drawing Sheets

HIGH DENSITY PLASMA SURFACE MODIFICATION FOR IMPROVING ANTIWETTING PROPERTIES

FIELD OF THE INVENTION

The invention relates generally to the modification of substrate surfaces to make these surfaces antiwetting. More specifically, the invention relates to a method of modifying the surface of a slider with a reactive fluorine compound to reduce absorption of moisture and hydrocarbon contaminants and, in turn, reduce mechanical stiction events.

BACKGROUND OF THE INVENTION

Conventional magnetic disk drives are information storage devices which utilize at least one rotatable magnetic media disk with concentric data tracks, a read/write transducer for reading and writing data on the various tracks, an air bearing slider for holding the transducer adjacent to the track generally in a flying mode above the media, a suspension for resiliently holding the slider and the transducer over the data tracks, and a positioning actuator connected to the suspension for moving the transducer across the media to the desired data track and maintaining the transducer over the data track during a read or a write operation.

The recording density of a magnetic disk drive is limited by the distance between the transducer and the magnetic media. One goal of air bearing slider design is to "fly" a slider as closely as possible to a magnetic medium while avoiding physical impact with the medium. Smaller spacings, or "fly heights", are desired so that the transducer can distinguish between the magnetic fields emanating from closely spaced regions on the disk.

In addition to achieving a small average spacing between the disk and the transducer, it is also critical that a slider fly at a relatively constant height. The large variety of conditions the transducers experience during the normal operation of a disk drive can make constancy of fly height anything but a given. If the flying height is not constant, the data transfer between the transducer and the recording medium may be adversely affected.

To ensure regular fly height, both disks and sliders are often coated or finished with compositions which will lubricate the respective surfaces or provide a hardened smooth surface. Magnetic disks are usually covered with a lubricant. In turn, the air bearing surface of a slider is usually finished with a smooth, hardened coating.

For example, all of U.S. Pat. Nos. 5,159,508; 5,175,658; and 5,271,802 show a magnetic head slider with an adhesive layer and a thin amorphous hydrogenated carbon layer which are used as a protective coating. The layers are deposited on the slider by plasma assisted chemical vapor deposition.

Japanese Patent Publication 7-331440 discloses formation of a crystalline carbon thin film on the surface of a metallic magnetic film. The film is formed by plasma chemical vapor deposition.

Ganapathi et al., U.S. Pat. No. 5,336,550, shows a magnetic disk slider with an adhesive layer and a continuous coating of carbon on its air bearing surface. The carbon coating is formed by sputter deposition.

Dovek, U.S. Pat. No. 5,499,149, shows a slider with front and rear air-bearing pads, giving improved interface properties. One objective of Dovek is to modify flying height and slider design so that the slider can withstand contact with the lubricant film on the disk.

Schmidt et al., U.S. Pat. No. 5,266,409, shows alloy films in which carbon, silicon, hydrogen, and fluorine are the principle elements. The films are deposited by plasma processing, using an RF self bias chamber or an ion beam deposition system. The films can be doped with fluorine, boron, oxygen, argon or helium for magnetic medium overcoat applications. The principle gases for these films are $CH_4/SiH_4$ and other dopant gases such as argon, helium, diborane ($B_2H_6$) and $CHF_3$.

Despite these advances, the varied environments that a disk drive is subjected to can create mechanical interaction between slider and disk. This mechanical interaction, often called "stiction", is a frictional resistance between slider and disk which prevents normal disk rotation and alters slider fly height. Lubricants, normally used to coat the disk to enhance operation, may also attract moisture and organic contaminants. In turn, these contaminants may increase the potential for stiction events between disk and slider.

As a result, there is a need for methods of surface modification which will provide a satisfactory conditioning of the substrate surface before definition of the slider surfaces to enhance disk drive operation.

SUMMARY OF THE INVENTION

In accordance with a first aspect of the invention, there is provided a method for modifying a substrate surface comprising the step of applying a high density plasma to the substrate surface in the presence of a hydrofluorocarbon gas and a carrier gas to form an antiwetting layer on the substrate surface.

In accordance with a more preferred aspect of the invention, there is provided a method for modifying the surfaces of a slider, comprising the steps of contacting the slider surface with a carrier gas for a period of time effective to clean the surface; and applying a high density plasma to the slider surface in the presence of a fluorine gas and a carrier gas for a period of time effective to coat the surface of the slider with an antiwetting layer.

Hydrocarbon and water moisture absorption can create stiction problems in disk drive assemblies. Dip processes for creation of an antiwetting layer on the substrate surface have been developed and implemented to solve these problems. However, these processes have encountered some technical difficulties in certain products.

Using High Density Plasma with a utilization of a separate RF source to control the ion bombardment, a dilute $H_2$ (5.8% in Argon) may be used to clean the slider surface and deposit both thick (50–100 Å) and thin (4–8 Å) carbon with $CHF_3$ or $CHF_3/H_2$ precursors.

A high density plasma process with an independent control of dissociative and ion bombardment frequencies will improve the control of a process window and hence the film properties.

As will be shown more specifically in the detailed description of the preferred embodiments, the invention has a number of advantages. The surface is thoroughly conditioned through a precleaning step, and the thickness of the deposition layer is controlled. Process control is increased. In turn, the invention provides greater variability in post surface modification processing and improved properties in the resulting film.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

The invention is generally a method for modifying a substrate surface by applying a high density plasma to the substrate surface in the presence of a hydrofluorocarbon gas and a carrier gas to form an antiwetting layer on the substrate surface. Optionally, a substrate surface, such as the air bearing surface of a slider, may be cleaned prior to the deposition of the antiwetting layer.

Generally, the method of the invention may be used to treat or condition the surfaces of any slider used in a disk drive or hard drive assembly, (HDA), common in the industry.

Figure 1:
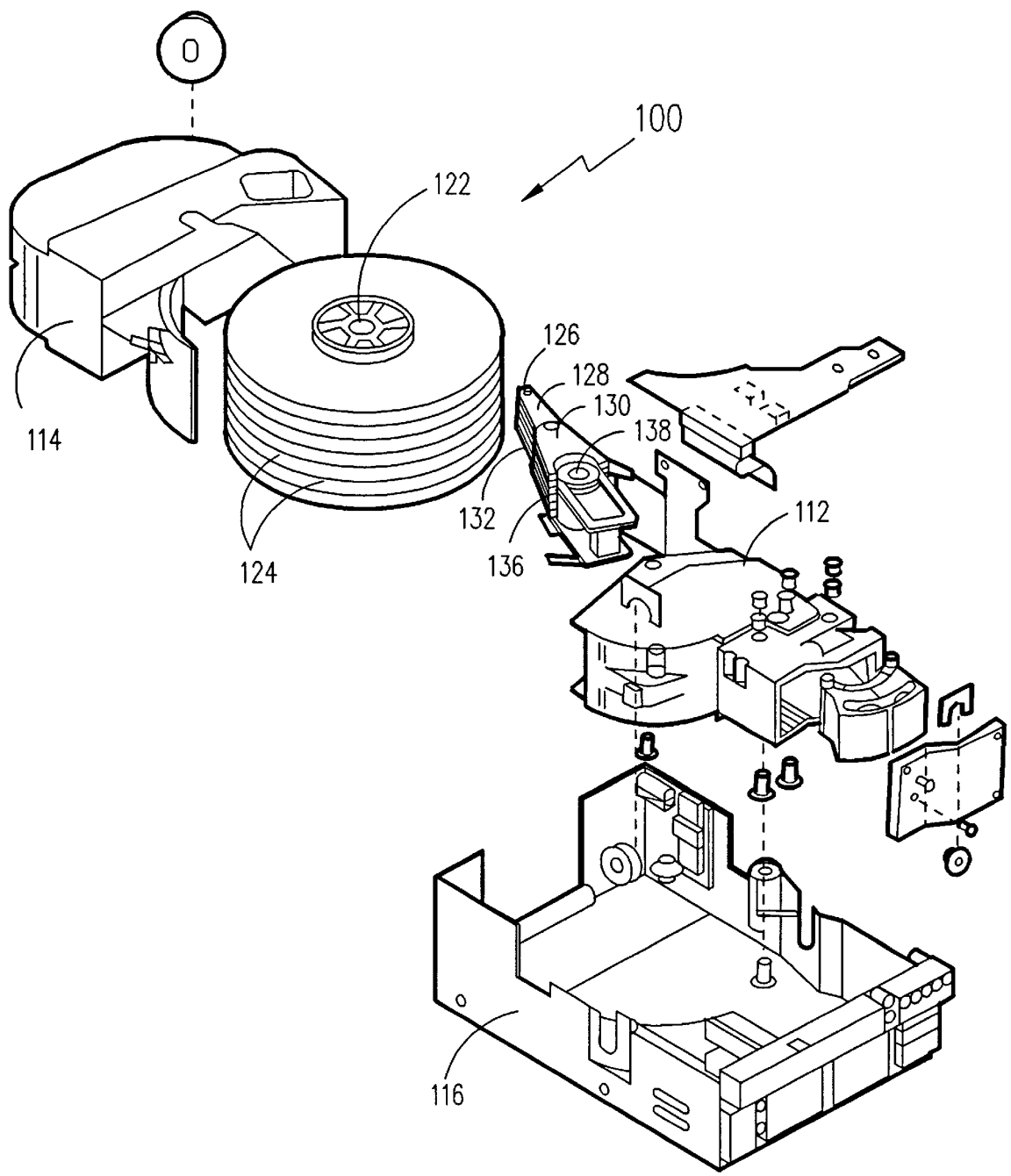
FIG. 1 is an exploded perspective view of an exemplary hard drive assembly including a slider.

An exemplary HDA may be seen in FIG. 1 which is an exploded view of a disk drive 100. The disk drive 100 includes a housing 112 and a housing cover 114 which, after assembly, is mounted within a frame 116. Mounted within the housing is a spindle shaft 122. Rotatably attached to the spindle shaft 122 are a number of disks 124. In FIG. 1, eight disks 124 are attached to the spindle shaft 122 in spaced-apart relation. The disks 124 rotate on spindle shaft 122 which is powered by a motor (not shown).

Information is written on, or read from, the disks 124 by heads or magnetic transducers (not shown) which are supported by sliders 126. Preferably, sliders in accordance with the invention are coupled to suspensions or load springs 128. The load springs 128 are attached to separate arms 130 on an E block or comb 132. The E block or comb 132 is attached at one end of an actuator arm assembly 136. The actuator arm assembly 136 is rotatably attached within the housing 112 on an actuator shaft 138.

In a typical digital data storage system, digital data is stored in the form of magnetic transitions on a series of concentric, closely spaced tracks comprising the surface of the magnetizable rigid data storage disks. The tracks are generally divided into a plurality of sectors, with each sector comprising a number of information fields. One of the information fields is typically designated for storing data, while other fields contain sector identification and synchronization information, for example. Data is transferred to, and retrieved from, specified track and sector locations by the transducers being shifted from track to track, typically under the control of a controller. The transducer assembly typically includes a read element and a write element. Other transducer assembly configurations incorporate a single transducer element used to write data to the disks and read data from the disks.

Writing data to a data storage disk generally involves passing a current through the write element of the transducer assembly to produce magnetic lines of flux which magnetize a specific location of the disk surface. Reading data from a specified disk location is typically accomplished by a read element of the transducer assembly sensing the magnetic field or flux lines emanating from the magnetized locations of the disk. As the read element passes over the rotating disk surface, the interaction between the read element and the magnetized locations on the disk surface results in the production of electrical signals in the read element. The electrical signals correspond to transitions in the magnetic field.

Figure 2A:
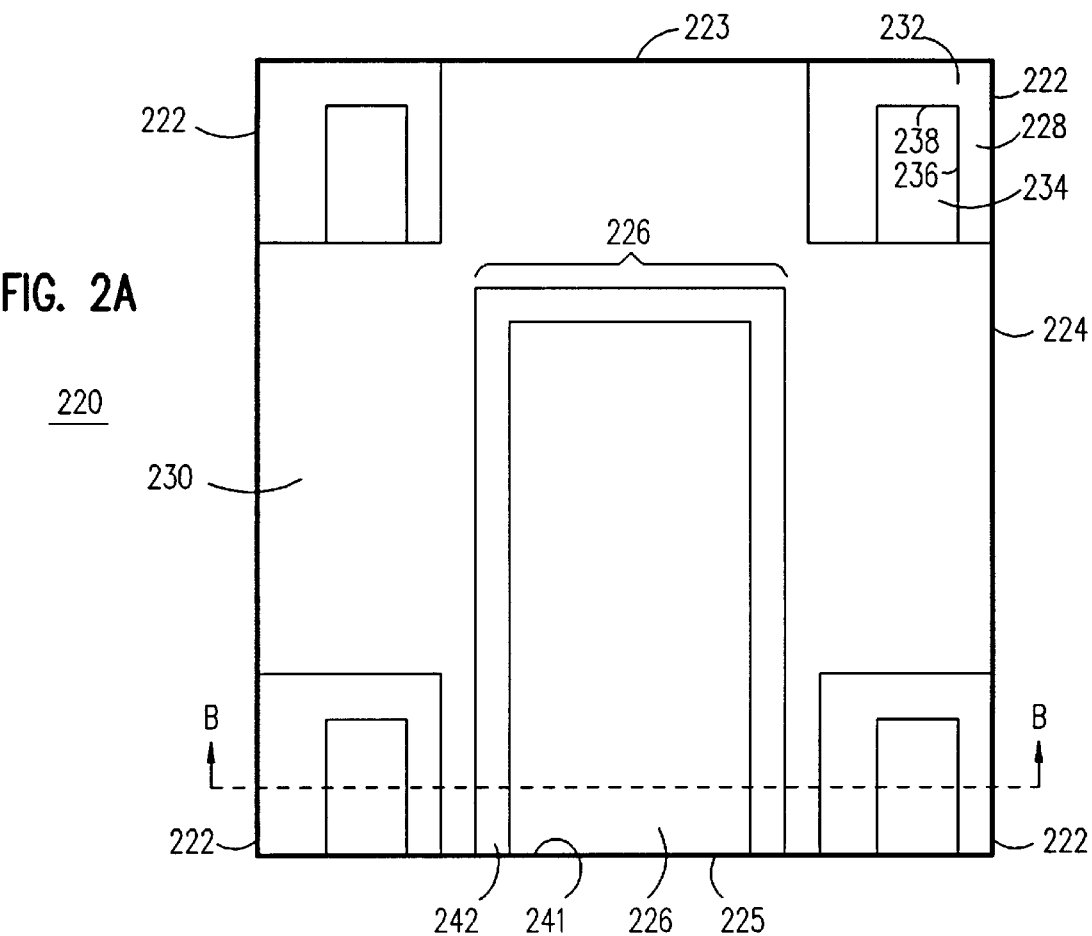
FIG. 2A is a bottom plan view of an exemplary slider.
Figure 2B:
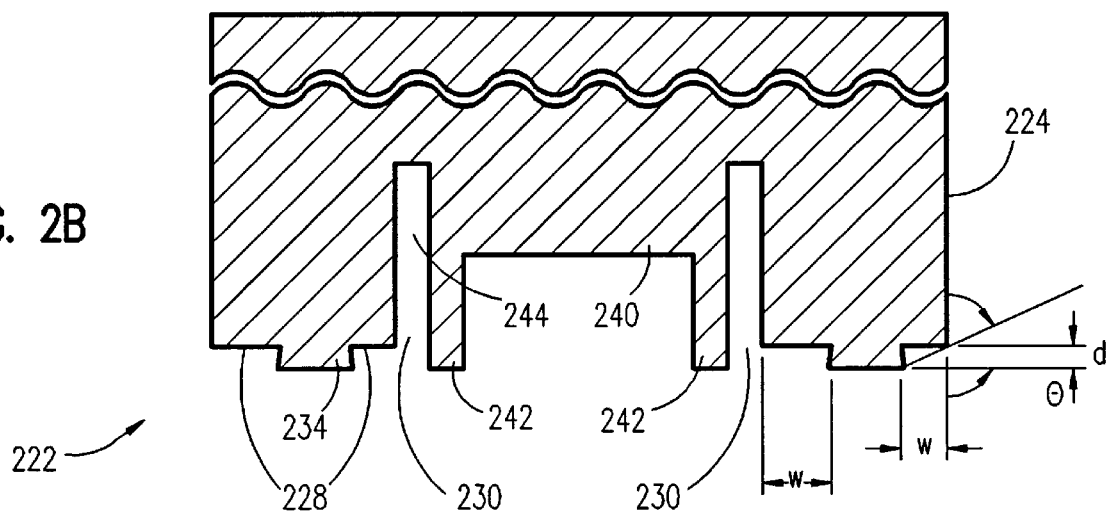
FIG. 2B is a partial cutaway view along axis B—B of the slider depicted in FIG. 2A.

To facilitate the read/write operations of the hard drive assembly, slider design can be intricate, to ensure correct and constant fly height in varying conditions. To fulfill the intended purpose of the slider, it is often patterned with various reliefs and protrusions to enhance aerodynamic character. For example, FIGS. 2A–2B illustrate a slider design 200 as disclosed in U.S. Pat. No. 5,404,256, issued Apr. 4, 1995 to James W. White, entitled "TRANSVERSE AND NEGATIVE PRESSURE CONTOUR GAS BEARING SLIDER", and which is incorporated by reference herein. The slider illustrated in FIGS. 2A–2B is designed to provide uniform and controllable fly height through a range of skew angles.

In FIGS. 2A–2B, traverse pressure contour (TPC) pads 222 are defined by a face 234 for creating a gas bearing effect, a generally U-shaped TPC section 228 including a constant depth step bearing along each side edge 236 of the face 234 and a constant depth step along the leading edge 238 forming a converging compression inlet 232. Thus, the gas bearing contour of the TPC pad 222 is defined by two parallel planes created by two different etch steps.

A negative pressure pad 226 is defined by a substantially planar surface which contains a recess 240 open at the trailing end 225. The negative pressure pad 226 may further include one or more bearing faces 242 at a height approximately that of the faces 234 of the TPC pads 222 for creating a gas bearing effect. Recess 240 is open along the trailing edge 241; that is, trailing edge 241 is substantially ambient. The ambient pressure reservoir 230 defines a cavity 244 having a depth and configuration sufficient to maintain substantial ambient pressure in the cavity during movement of the disk. Further, ambient pressure reservoir 230 includes a non-tapered (non-stepped, non-convex) inlet along leading edge 223 so as to inhibit generation of gas bearing effects created by compression of inlet gas.

The varying etch depths and patterning of the slider shown in FIGS. 2A–2B show that there is an abundant opportunity for stiction events between disk and slider. As a result, there is a real need for surface modification which enhances interaction between the slider and disk.

Processing

High density plasma tools, known to those of skill in the art may be used to treat the intended substrates in accordance with the invention. Generally the substrates which may be modified with the method of the invention comprise from about 60 wt-% to 70 wt-% alumina and 30 wt-% to 40 wt-% titanium carbide. Other ceramic substrates with thin film coating can also be modified by this method.

High density plasma tools, such as inductively coupled plasma etchers (ICP), electron cyclotron resonance etchers (ECR), or Helicon plasma etchers are then utilized to form the fluorocarbon polymer layer. This layer serves as an anti-wetting agent on the slider. By using these etchers, plasma density (ion current density and reactive neutral density) and the ion bombardment energy may be controlled independently by two separate RF/microwave generators to achieve the stated etching results.

The plasma density is adjusted by changing the source power while the ion bombardment energy is controlled by a separate RF source. The excitation frequency of the separate RF source is at 13.56 MHz or below to achieve desired ion bombardment. Since the properties of the antiwetting layer depend on the plasma density and the ion bombardment energy, the independent control of the density and the energy offers a greater process latitude to obtain a film with desired properties.

The main gas used for fluorocarbon deposition is $CHF_3$. This gas is known to produce a polymer precursor, (such as $CF_2$), in a plasma environment. Other gases which may be used include hydrofluoroalkane gases such as hexafluorobutane, and tetrafluoroethane, and mixtures of these gases or trifluoromethane. Argon may be mixed with $CHF_3$ in the deposition process. Argon dilutes the plasma and therefore may be used to adjust the deposition rate. Argon produces high ion current because of its high ionization efficiency. Thus, argon may also be used to control the rate of bombardment in the deposition process.

Hydrogen may also be added to $CHF_3$ in the plasma process. Hydrogen reacts with the fluorine in the plasma and changes the fluorine/carbon concentration ratio of the thin film. Hydrogen also scavenges any oxygen present due to the etching of the quartz parts in the plasma reactor.

In a preferred embodiment, an inductively coupled plasma reactor may be used. The source power is coupled into the plasma by a planar coil and a quartz window. The bottom electrode, where the parts are placed for deposition, is powered by a separate 13.56 MHz RF source.

For deposition of the antiwetting layer, the source power density maybe about 1.2 $W/cm^2$ and the bias power density maybe about 0.24 $W/cm^2$. The pressure can be set at 10 mtorr and the gases were 25 sccm of $CHF_3$ and 25 sccm of argon-6% hydrogen. After 15 seconds deposition time, the modified/deposited thickness may range from about 6 to 8 angstroms.

A dry cleaning step may be applied prior to surface modification and deposition. In this embodiment, the source power density and bias power density maybe about 2.4 $W/cm^2$ and 0.24 $W/cm^2$, respectively. The flow maybe about 80 sccm of argon-6% hydrogen and the pressure was 5 mtorr.

The cleaning period may run for about 5 seconds. This cleaning process was designed to remove the surface contamination that inhibits the deposition process and changes the film property. This cleaning step also provides an active surface for bonding the $CF_2$ groups generated in the plasma.

The tables below provide exemplary processing guidelines for the precleaning step according to the method of the invention.

TABLE 1

| Gases | | | |
|---|---|---|---|
| GAS FLOWRATE | USEFUL | PREFERRED | MORE PREFERRED |
| Argon (Vol-%) | 10–99 | 90–95 | 94–95 |
| Hydrogen (Vol-%) | 1–90 | 5–10 | 5–6 |
| REACTION PARAMETERS | | | |
| PARAMETER | USEFUL | PREFERRED | MORE PREFERRED |
| Temperature (°C.) | 5–80 | 15–30 | 20–25 |
| Time (Seconds) | 5–30 | 10–20 | 12–17 |
| Ion Bombardment Energy (ev) | 10–80 | 30–60 | 40–50 |
| Pressure (mtorr) | 0.1–50 | 2–20 | 5–10 |
| Source Power Density (w/cm$^2$) | 0.2–5 | 2–3 | 2.4–2.5 |

The Tables provided below provide exemplary processing guidelines for deposition of the antiwetting layer according to the method of the invention.

TABLE 2

| Gases | | | |
|---|---|---|---|
| GAS FLOWRATE | USEFUL | PREFERRED | MORE PREFERRED |
| Argon (Vol-%) | 0–60 | 35–60 | 48–49 |
| Hydrogen (Vol-%) | 0–10 | 0.5–5 | 0.6–1.0 |
| Fluorine Gas (Vol-%) | 30–100 | 40–60 | 50 |

TABLE 2-continued

| Reaction Parameters | | | |
|---|---|---|---|
| PARAMETER | USEFUL | PREFERRED | MORE PREFERRED |
| Temperature (°C.) | 5–80 | 15–30 | 20–25 |
| Ion bombardment energy (ev) | 10–80 | 30–60 | 40–50 |
| Pressure (mtorr) | 0.1–50 | 2–20 | 5–10 |
| Source Power Density (W/cm$^2$) | 0.2–5 | 2–3 | 2.4–2.5 |
| Time (Seconds) | 5–90 | 5–30 | 10–15 |

Antiwetting layer thickness preferably ranges from about 2 Å to 20 Å, more preferably from about 10 Å to 15 Å, with the process of the invention offering adequate control to deposit both thick films (about 50 to 100 Å) and thin films (about 4 to 8 Å).

EXAMPLES

The following working and comparative examples provide a typical nonlimiting illustration of some of the advantages of the invention.

Silicon wafers coated with 125 Å of sputtered carbon, Blanket AlTiC ($Al_2O_3$TiC) rows, Magnetoresistance device fabricated on AlTiC rows and completed HDA sliders with and without thin (70–125 Å) carbon overcoat layers were coated using the process of the invention (dry cleaning and surface modification steps). After processing under the conditions mentioned above, the contact angle (with water) of the modified/coated surfaces are in the range of 90–115°. The high contact angle indicates the high hydrophobic property of the surface toward water. By measuring the angle of the sidewall of a water drop, one can determine the relative hydrophobicity of the surface. The higher the contact angle of the water drop, the greater the relative hydrophobicity. The relative angle measured is between the side of the water droplet and the surface of application.

Electron Spectroscopy for Chemical Analysis (ESCA) results showed that the modified/deposited films on the surface are fluorocarbon films with a significant more amount of $CF_2$ bonding groups as compared to $CF_3$ in the film bulk. This result shows a teflon-like bonding on surface and accounts for its hydrophobic behavior. The film thickness analyzed by ESCA is about 8–10 Angstroms. Hydrocarbon vapor spraying on HDA slider surfaces modified by this process show no (Zero) Hydrocarbon droplet formation as compared to thousands of droplets formed on non-modified surfaces. This result showed excellent anti-wetting properties of the surface modified/deposited by this process.

TABLE 3

| Example Surface Composition | Preclean Process Condition | Fluorination/ Deposition | Range of Thickness Added (A) | Average Contact Angle (degree) |
|---|---|---|---|---|
| Control Blank Alumina | No Process | No Process | No film | 58–60 |
| 1A Fluorinated Alumina | Ar/H2 (5.8% H2 = 80 sccm, 5 mT, 30 sec., 300W/30W bias rf | CHF3 = 40 sccm, Ar/H2 (5.8% H2) = 10 sccm, 10 mT, 15 sec., | 120A | 95–96 |

TABLE 3-continued

| Example Surface Composition | Preclean Process Condition | Fluorination/ Deposition | Range of Thickness Added (A) | Average Contact Angle (degree) |
|---|---|---|---|---|
| 1B Alumina | Ar/H2 (5.8% H2 = 80 sccm, 5 mT, 30 sec., 300W/30W bias rf | 300W/30W bias rf CHF3 = 40 sccm, Ar/H2 (5.8% H2) = 10 sccm, 10 mT, 15 sec., 300W/30W bias rf | 120A | 96–97 |
| 2A Fluorinated Alumina | Ar/H2 (5.8% H2 = 80 sccm, 5 mT, 30 sec., 300W/30W bias rf | CHF3 = 50 sccm, 10 mT, 15 sec., 300W/30W bias rf | 95A | 97–98 |
| 2B Alumina | Ar/H2 (5.8% H2 = 80 sccm, 5 mT, 30 sec., 300W/30W bias rf | CHF3 = 50 sccm, 10 mT, 15 sec., 300W/30W bias rf | 95A | 97–98 |
| 3A Fluorinated Alumina | Ar/H2 (5.8% H2 = 80 sccm, 5 mT, 30 sec., 300W/30W bias rf | CHF3 = 25 sccm, Ar/H2 (5.8% H2) = 25 sccm, 10 mT, 15 sec., 150W/30W bias rf | 8–10A | 94–96 |
| 3B Alumina | Ar/H2 (5.8% H2 = 80 sccm, 5 mT, 30 sec., 300W/30W bias rf | CHF3 = 25 sccm, Ar/H2 (5.8% H2) = 25 sccm, 10 mT, 15 sec., 150W/30W bias rf | 8–10A | 95–96 |

The above specification, examples and data provide a complete description of the manufacture and use of the methods and composition of the invention. Since many embodiments of the invention can be made without departing from the spirit and scope of the invention, the invention resides in the claims hereinafter appended.

What is claimed is:

1. A method for modifying the air bearing surface of a ceramic slider, said method comprising the steps of applying a high density plasma to the slider surface in the presence of a hydrofluorocarbon gas and a carrier gas to form an antiwetting layer on the ceramic slider surface wherein the carrier gas is a mixture of argon and hydrogen.

2. The method of claim 1, wherein the hydrofluorocarbon gas comprises hydrofluoroalkane.

3. The method of claim 1, wherein the hydrofluorocarbon gas is selected from the group consisting of trifluoromethane, hexafluorobutane, tetrafluoroethane, and mixtures thereof.

4. The method of claim 1, wherein the flow rate of the hydrofluorocarbon gas ranges from about 30 to 100 Vol %.

5. The method of claim 1, wherein surface modification takes place at an ion bombardment energy ranging from about 10 to 80 eV.

6. The method of claim 1, wherein surface modification takes place at a plasma rf power density ranging from about 0.2 to 5.0 W/cm$^2$.

7. The method of claim 1, wherein the argon having a flow rate of about 35 to 60 Vol-% and the hydrogen having a flow rate of about 0.5 to 5 Vol-%.

8. A method for modifying the air bearing surface of a ceramic slider, said method comprising the steps of:

(a.) contacting the ceramic slider surface with a carrier gas for a period of time effective to clean the surface; and (b.) applying a high density plasma to the ceramic slider surface in the presence of a hydrofluorocarbon gas and a carrier gas for a period of time effective to coat the ceramic surface of the slider with an antiwetting layer;

wherein said surface modification takes place at an ion bombardment energy ranging from about 10 to 80 eV and the carrier gas is a mixture of argon and hydrogen.

9. The method of claim 8, wherein the hydrofluorocarbon gas comprises hydrofluoroalkane.

10. The method of claim 8, wherein the hydrofluorocarbon gas is selected from the group consisting of trifluoromethane, hexafluorobutane, tetrafluoroethane, and mixtures thereof.

11. The method of claim 8, wherein the flow rate of the hydrofluorocarbon gas ranges from about 30 to 100 Vol-%.

12. The method of claim 8, wherein the argon having a flow rate of about 35 to 60 Vol-% and the hydrogen having a flow rate of about 0.5 to 5 Vol-%.

13. The method of claim 8, wherein surface modification takes place at a plasma rf power density ranging from about 0.2 to 5.0 W/cm$^2$.

* * * * *